May 31, 1949.　　　　　　I. GEBEL　　　　　　2,471,869
COIL CONSTRUCTION AND METHOD
Filed March 14, 1946　　　　　　　　　　　　　3 Sheets-Sheet 1
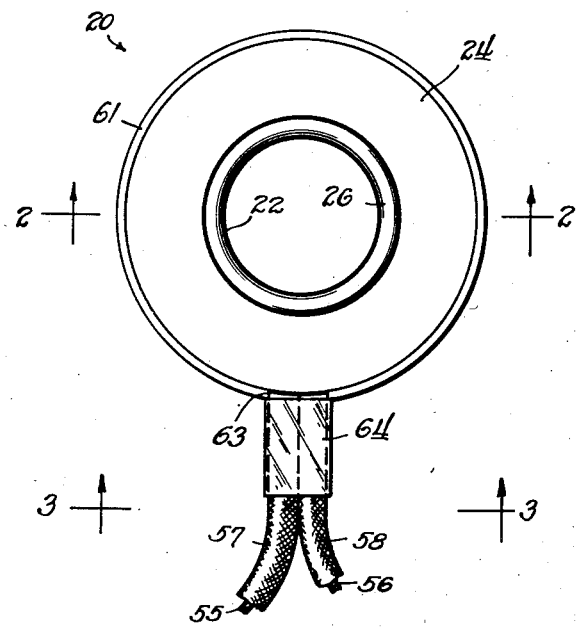
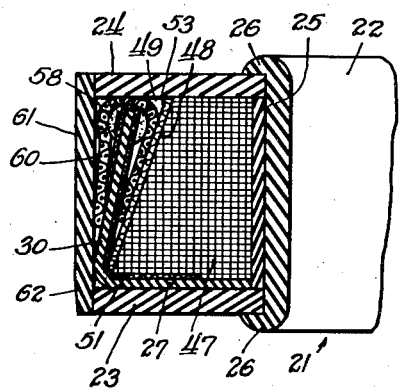
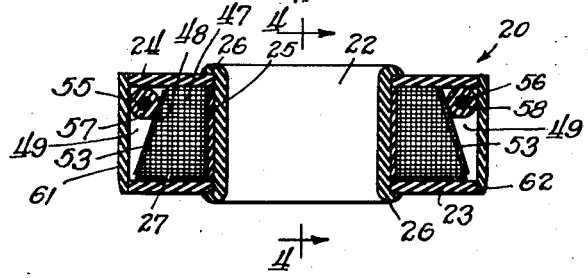
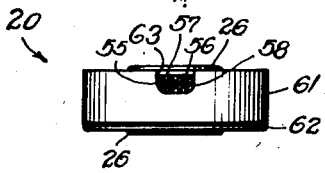
Inventor:
Irving Gebel
By Brown, Jackson, Boettcher & Dienner
Attys.

May 31, 1949.　　　　　I. GEBEL　　　　2,471,869
COIL CONSTRUCTION AND METHOD
Filed March 14, 1946　　　　　　　　　　3 Sheets-Sheet 2
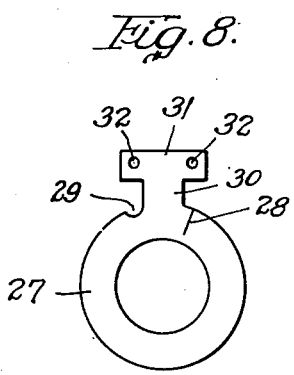
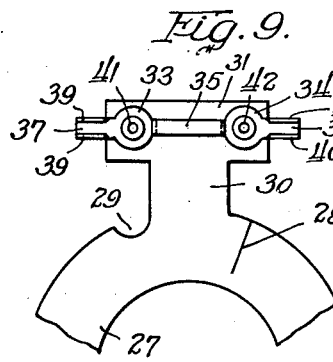
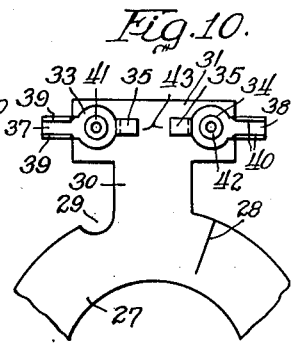
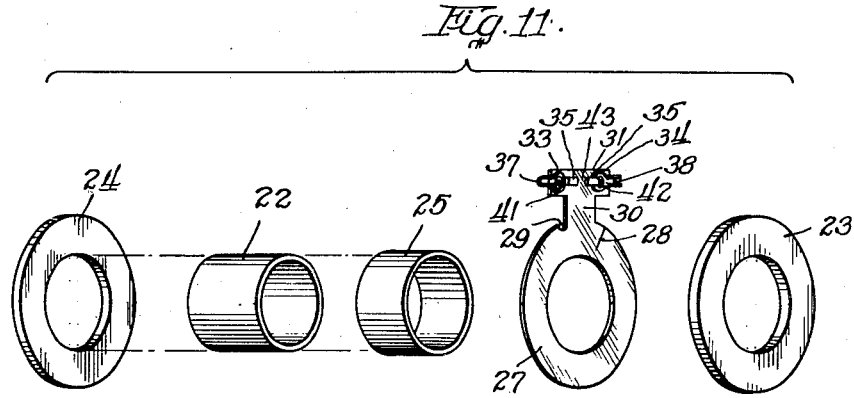
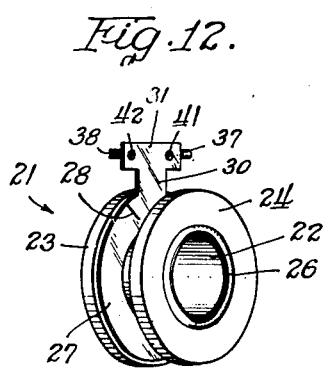
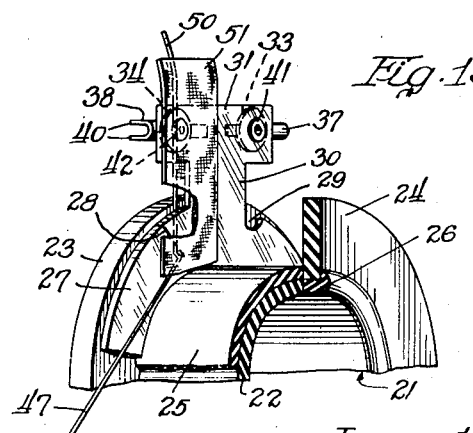
Inventor:
Irving Gebel,
By Brown, Jackson, Boettcher & Dienner
Attys.

May 31, 1949. I. GEBEL 2,471,869
COIL CONSTRUCTION AND METHOD
Filed March 14, 1946 3 Sheets-Sheet 3
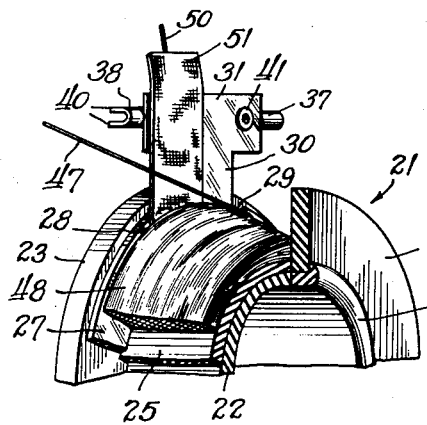
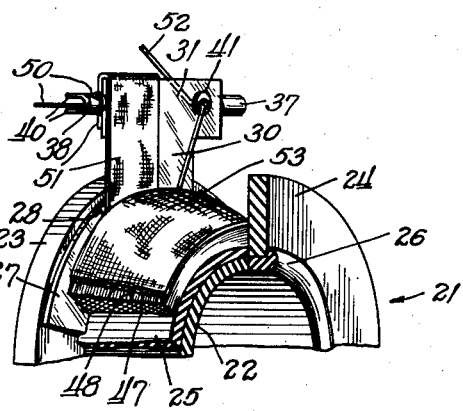
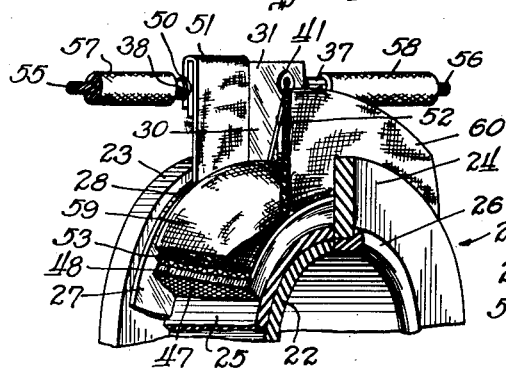
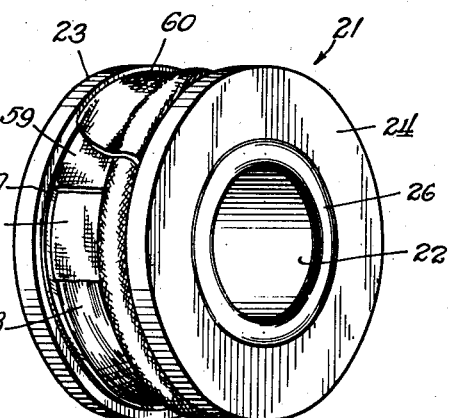
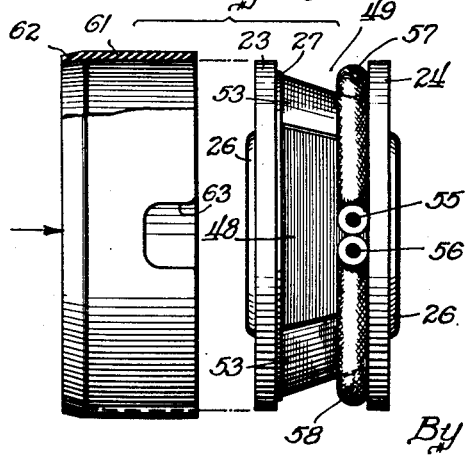
Inventor:
Irving Gebel.
By Brown, Jackson, Boettcher & Dienner
Attys Patented May 31, 1949

2,471,869

UNITED STATES PATENT OFFICE 2,471,869

COIL CONSTRUCTION AND METHOD

Irving Gebel, Chicago, Ill., assignor to International Register Co., a corporation of Illinois Application March 14, 1946, Serial No. 654,350

11 Claims. (Cl. 175—21)

My invention relates, generally, to magnet coil construction and methods for assembling the same and it has particular relation to magnet coils for small synchronous electric motors such as are used for operating clocks, time control mechanisms and the like, which require a compact construction involving a minimum of expense.

In the manufacture of such coils certain features are required. It is essential that the arrangement be such as to provide the necessary electrical insulation between the individual turns of the coil and also between the coil ends to which the external leads are connected. Because of space limitations, the over-all size of the coil and its spool must be held to a minimum consistent with providing the necessary number of ampere turns to provide the required electromagnetic effect. Expense is also a factor in the construction of these coils.

The clock and time switch fields are highly competitive. A reduction in the cost of the motor for such devices, even though it may be only a few cents, often gives the manufacturer a highly improved competitive position. One reason for this is that motors for these applications are made at the rate of several thousand per day. Thus a reduction in cost of a relatively minor amount for each motor amounts to a substantial sum when the volume of production is considered.

In accordance with the present invention, particular attention has been paid to the reduction in the cost of assembling the coil construction for a motor of the type above referred to. Particular attention has been paid to the arrangement of the coil terminals and connection of the external leads thereto so as to require a minimum of insulating material while providing a maximum degree of insulation between parts that are maintained at a difference of potential. However, particular attention has been paid to the manner in which the coil is wound on the spool so as to leave sufficient space for the external relatively large diameter fabric insulated leads without requiring any increase in the external diameter of the spool.

The object of my invention, generally stated, is to provide a magnet coil for small synchronous electric motors and the like which shall be simple and compact in construction and which may be readily and economically manufactured together with an improved method for assembling the same.

Another object is to wind the magnet coil so as to provide a space for the external leads without increasing the overall diameter of the coil spool to accommodate them.

A further object is to mount terminals on the coil spool for the coil ends and external leads prior to winding the coil.

A still further object is to insulate fully the coil, terminals and leads using a minimum of insulating material and thereby reducing the coil size and expense involved in making and assembling the same.

Another object is to cause high voltage surges, that would otherwise pass through the coil and possibly puncture its insulation, to by-pass the coil.

Still another object is to incorporate a spark gap in the terminal construction to by-pass these surges.

A further object is to facilitate the assembly of the terminals on an insulating strip by first securing them thereto while they are rigidly connected together and then severing the rigid connection to separate electrically the terminals and, if desired, to provide a spark gap therebetween.

Other objects of my invention will, in part, be obvious and in part appear hereinafter.

My invention is disclosed in the embodiment thereof shown in the accompanying drawings and it comprises the features of construction, combination of elements, arrangement of parts and method of assembly which will be exemplified in the construction hereinafter set forth and the scope of the application of which will be indicated in the appended claims.

For a more complete understanding of the nature and scope of my invention reference can be had to the following detailed description taken in connection with the accompanying drawings in which:

Fig. 1 is a view, in front elevation, of a magnet coil constructed in accordance with the present invention;

Figure 2 is a detail sectional view taken along the line 2—2 of Figure 1;

Figure 3 is a view taken along the line 3—3 of Figure 1 and at a slightly reduced scale;

Figure 4 is a detail sectional view taken along the line 4—4 of Figure 2;

Figure 5 is a top plan view of the lead wire terminal assembly;

Figure 6 is a view, in side elevation, of the terminal assembly shown in Figure 5;

Figure 7 is a detail sectional view taken along the line 7—7 of Figure 6;

Figure 8 is a view, in front elevation, of the lead anchor or terminal support washer;

Figure 9 is a view, in front elevation, at an enlarged scale of the upper portion of the washer shown in Figure 8 with the terminal assembly shown in Figure 5 mounted thereon;

Figure 10 is a view similar to that of Figure 9 and illustrating how a spark gap may be formed between the terminals by severing the intermediate portion of the connecting bar therebetween;

Figure 11 is a perspective view of the parts making up the coil spool, the parts being shown in spaced relation;

Figure 12 is a perspective view of the parts shown in Figure 11 in assembled relation;

Figure 13 is a perspective view of the upper portion of the coil spool showing the manner in which the beginning end of the wire is fastened in place preparatory to winding the coil;

Figure 14 is a view similar to Figure 13 showing how the coil is wound so as to provide a larger number of turns adjacent one rim of the spool than is provided adjacent the other rim;

Figure 15 is a perspective view showing the application of insulation to the coil after the winding thereof has been completed;

Figure 16 is a perspective view showing how additional insulation is applied for the coil and lead terminals;

Figure 17 is a perspective view showing the completed coil assembly prior to application of the cover and;

Figure 18 is a view, partly in side elevation and partly in section, showing the coil cover and its relation to the coil as shown in Figure 17 prior to assembly thereover.

Referring now particularly to Figures 1, 11 and 12 of the drawings, it will be noted that reference character 20 designates, generally, a coil construction made in accordance with the present invention. This comprises a spool shown generally at 21 which may be made up of a sleeve 22 over the ends of which end washers 23 and 24 are placed to form the spool rims. The washers 23 and 24 are spaced apart by a cylindrical spacer 25. The ends of the sleeve 22 are curled over the outer sides of the end washers 23 and 24 as indicated at 26 in Figure 4.

It will be understood that the parts making up the spool 21 are formed of suitable insulating material. The sleeve 22 and spacer 25 may be formed of spiral wound fish paper while the washers 23 and 24 may be formed of "Bakelite."

With a view to mounting terminals on the spool 21 for connection to the coil ends and for connection to external leads a lead anchor washer 27 is located adjacent to one of the washers of the spool 21. As indicated in Figure 12 it may be located adjacent the end washer 23. The washer 27 is formed of suitable insulating material such as vulcanized fiber.

As shown in Figures 8 and 11 of the drawings the washer 27 is radially sheared as indicated at 28 for receiving the beginning end portion of the wire that is to be wound on the spool 21. The washer 27 is also provided with a semicircular cut-away section 29 which together with the sheared section 28 permits a terminal support portion 30 with its transversely extending terminal support 31 to be bent over the coil as indicated in Figure 4. The terminal support 31 is apertured as indicated at 32 in Figure 8 for receiving correspondingly apertured terminals 33 and 34, Figure 5, which are preferably formed of brass and initially interconnected by a bar 35. Each of the terminals 33 and 34 has extending therefrom lead receiving portions 37 and 38 from which lips 39 and 40 extend that may be be deformed over the coil ends and terminal leads as will appear hereinafter.

It is important in the assembly of the terminals 33 and 34 on the terminal support 31 that they be joined together initially. This facilitates handling thereof and placing the same in position on the terminal support 31 with the lead receiving portions 37 and 38 extending in opposite directions. As indicated in Figure 9, the terminals 33 and 34, joined together by the bar 35, are placed on the terminal support 31 with the apertures therein registering with the apertures 32. Eyelets 41 and 42 are then applied to hold the terminals 33 and 34 in place on the terminal support portion 31.

Of course it is necessary that the connecting bar 35 be severed since the terminals 33 and 34 are energized at opposite potentials. It will be understood that the connecting bar 35 can be severed from the terminals 33 and 34 in its entirety. However, it is desired to provide a spark gap, such as a spark gap 43, shown in Figure 10 between the terminals 33 and 34. Accordingly, only the intermediate portion of the connecting bar is severed as there shown thus providing portions projecting toward each other from the terminals 33 and 34 which form the spark gap therebetween. When the coil, which will be described hereinafter, is mounted on a magnetic core, it provides a substantial amount of impedance. Thus, when a voltage surge is applied thereto, it is entirely possible that the insulation of the coil may be broken down, particularly the insulation adjacent one of the coil ends. By providing the spark gap 43 in parallel with the coil, the high voltage surge by-passes the coil in the formation of an arc at the spark gap. The length of the spark gap 43 is in part determined by the normal voltage that will be applied by the terminals 33 and 34. It should be sufficient to provide adequate insulation therebetween. It should not be too great or otherwise the voltage incident to the surge may not be sufficient to break it down.

In Figure 4 of the drawings the turns of the coil are indicated at 47. It will be noted that these turns are so placed on the spool 21 that a larger number is located adjacent the rim or washer 23 than is located adjacent the opposite rim or washer 24. Thus, the outer layer as indicated at 48 is disposed along a bias with respect to the end washers 23 and 24 and the turns of the coil themselves are so arranged as to provide a frustoconical surface. This provides a terminal lead receiving annular space 49 which is generally triangular in cross section. As will hereinafter appear, this annular space 49 serves to receive the terminals 33 and 34 and the terminal leads which are connected thereto.

Referring now to Figure 13, it will be noted that the beginning coil end 50 of the wire 47 is passed through the sheared slot 28 in the washer 27 and extends along the back of the terminal support portion 30—31. The wire 47 is preferably enamel insulated magnet wire and is of relatively small diameter, for example, No. 39 or No. 40 magnet wire may be used having a diameter of about .0032". The enamel is removed from the coil end 50 and it is wrapped around one of the lips 40 to provide for connection to the terminal 34. A short length of insulating tape 51 is placed over a portion of the inside of the terminal suport 30—31 as shown for the purpose of holding the coil end 50 in place and providing additional insulation therefor. It will be noted that after the coil end 50 is placed in the sheared slot 28 it extends upwardly between the end washer 23 and the washer 27.

The wire 47, thus started, is wound on the spool 21 as shown in Figure 14 so as to provide the desired frusto-conical surface with the outer layer 48 of the turns. The end portion 52 of the wire 47 is positioned along the terminal support 30—31 and is threaded through the eyelet 41. The enamel insulation is removed therefrom and it is wound around one of the lips 39 to provide connection to the terminal 33. Also as shown in Figure 15 a short length of insulating tape 53 is positioned over the outer layer 48 of the coil 47 for holding the same in place and insulating the terminals 33 and 34 therefrom. The tape 53 is at least sufficiently long to provide a barrier between the terminals 33 and 34 and their lead receiving portions 37 and 38 and the coil 47. Preferably the tape 53 extends about ⅔ of the way around the outer layer 48 as indicated in Figure 18.

External flexible conductors or leads 55 and 56, as shown in Figure 16, are now placed in the lead receiving portions 38 and 37 of the terminals 34 and 33 and the lips 40 and 39 are deformed thereover by a suitable tool so as to provide good mechanical and electrical connection not only between the terminals 34 and 35 and the flexible conductors 55 and 56 but also between terminals 34—33 and the coil ends 50—52. When this construction is employed, it is unnecessary to secure the coil ends 50 and 52 to the flexible leads 55 and 56 by welding or soldering. The simple mechanical connection therebetween provides the required electrical connection and at the same time reduces the cost in making the same since it is unnecessary to apply heat for performing a welding or soldering operation.

The flexible conductors 55 and 56 are necessarily relatively large for mechanical reasons. They may be formed of No. 18 or No. 20 stranded conductor and they may be covered with fabric insulation 57 and 58. The insulation 57—58 has a relatively large outside diameter as compared to the diameter of the wire 47. For example, the outside diameter of the insulation 57—58 may be of the order of .125".

Next as illustrated in Figure 16 a relatively wide piece of tape 59, such as varnished cambric, is applied over the tape 53 having a portion 60 which is arranged to be folded over the terminal support 31 and the terminals 33 and 34 thereon together with the ends of the leads 55 and 56.

The terminal support 31 with the terminals 34 and 33 thereon and flexible leads 55 and 56 connected thereto is folded over the coil 47, as shown more clearly in Figure 4. The terminals 34 and 33 and the leads 55 and 56 then occupy the lead receiving space 49 formed between the end washer 24 and outer layer 48 of the turns of the coil 47 which are disposed on a bias. The portion 60 of the insulation 59 is folded thereover, the arrangement being such that no part projects above the outer edges of the washers 23—24.

The external leads 55—57 and 56—58 are then placed in the lead receiving space 49, as illustrated in Figures 17 and 18 below the outer edges of the washers 23—24. These leads extend in opposite directions until they meet at a point substantially opposite the terminals 33—34 where they are bent to extend radially outwardly from the spool 21.

Thereafter a tubular insulating coil cover 61, Figure 18, is slipped over the end washer 23 sufficiently far to extend also over the other end washer 24 so that the same are covered as will be clear from Figure 3. One edge 62 of the coil cover 61 is deformed inwardly slightly, as illustrated in Figure 18, so as to provide a snug fit with the end washer 23. A suitable aperture or cut-away section 63 is provided in the coil cover 61 through which the ends of the external leads 55—57 and 56—58 may extend.

A sleeve of insulation 64, Figure 1, in the form of one or more layers of insulating tape is provided around the external leads as they project through the apertures 63 and the cover 61 so as to hold the same together in this location.

While the washer 27 is illustrated for carrying the terminal support 30—31 and holding the same in place on the spool 21 other means may be provided for this purpose. For example, the washer 27 may be omitted except for the portion thereof which constitutes an extension in the terminal support 30. This may be secured to the washer 23, for example, by suitable means such as by an adhesive thereby obviating the necessity of providing the remainder of the washer 27 extending around the spool 21.

The formation of the spark gap 43 has been described hereinbefore as being made by severing the intermediate portion of the connecting bar 35. This may be accomplished before the washer 27 carrying the terminals 33—34 is assembled on the spool 21. Also it may be accomplished after the assembly is made as shown in Figure 12.

Since certain further changes can be made in the foregoing construction and method without departing from the spirit and scope thereof, it is intended that all matter shown on the accompanying drawings and described hereinbefore shall be interpreted as illustrative and not in a limiting sense.

I claim as my invention:

1. An energizing coil for an electromagnetic device comprising, in combination, an insulating spool, a coil of wire on said spool with the outer layer thereof on a bias so as to provide an annular lead receiving space between it and one rim of said spool, terminals for the ends of said coil disposed in insulated spaced relation in said space, and insulated leads connected to said terminals and extending annularly in opposite directions around said coil in said space.

2. An energizing coil for an electromagnetic device comprising, in combination, an insulating spool, a coil of wire on said spool with the outer layer thereof on a bias so as to provide an annular lead receiving space between it and one rim of said spool, terminals for the ends of said coil disposed in insulated spaced relation in said space, insulated leads connected to said terminals and extending annularly in opposite directions around said coil in said space below the outer edges of the rims of said spool, and an insulating sleeve snugly interfitting over said edges with said leads projecting therethrough at the side opposite said terminals.

3. A magnet coil comprising, in combination, an insulating spool, a coil of insulated relatively fine magnet wire wound on said spool in such manner as to provide a generally frusto-conical surface forming with one rim of the spool an annular lead receiving space having a generally triangular cross section, and relatively large insulated leads connected to the ends of said coil and extending annularly therefrom in opposite directions in said space adjacent said rim around said coil.

4. A magnet coil comprising, in combination, an insulating spool, a coil of insulated relatively fine magnet wire wound on said spool in such manner as to provide a generally frusto-conical surface forming with one rim of the spool an annular lead receiving space having a generally triangular cross section, relatively large insulated leads connected to the ends of said coil and extending annularly therefrom in opposite directions in said space adjacent said rim around said coil below the outer edges of the rims of said spool, and an insulating sleeve snugly interfitting over said edges with said leads projecting therethrough at the side opposite the connection thereof to said coil ends.

5. A magnet coil comprising, in combination, an insulating spool, a coil of insulated relatively fine magnet wire wound on said spool in such manner as to provide a generally frusto-conical surface forming with one rim of the spool an annular lead receiving space having a generally triangular cross section, terminals for the ends of said coil, means holding said terminals in insulated spaced relation in said space, relatively large insulated leads connected to said terminals and extending in opposite directions around said coil in said space adjacent said rim and below the outer edge thereof, and an insulating sleeve snugly fitting over the outer edges of the rims of said spool with said leads projecting therethrough at a position spaced from said terminals.

6. A magnet coil comprising, in combination, an insulating spool having annular rims at the ends, an insulating washer between said rims and adjacent one of them and having a terminal support portion extending therefrom, a pair of terminals carried in spaced relation by said support portion, a coil of magnet wire on said spool with the ends connected to said terminals, external leads connected to said terminals, said support portion with said terminals thereon extending over said coil between said rims, and a layer of insulation surrounding said coil and extending over said terminal support portion and through which said leads extend.

7. A magnet coil comprising, in combination, an insulating spool having annular rims at the ends, an insulating washer between said rims and adjacent one of them and having a terminal support portion extending therefrom, a pair of terminals carried in spaced relation by said support portion, a coil of magnet wire on said spool with the ends connected to said terminals, the turns of said coil being so disposed as to provide a substantially greater number adjacent said washer than is provided adjacent the opposite rim whereby a lead space is provided thereadjacent, flexible insulated leads also connected to said terminals, said support portion with said terminals thereon and leads connected thereto extending over said coil with said terminals and leads positioned in said lead space, said leads extending in opposite directions around said coil in said lead space, and an insulating sleeve snugly fitting over the outer edges of the rims of said spool with said leads projecting therethrough at a position spaced from said terminals.

8. A magnet coil comprising, in combination, an insulating spool having annular rims at the ends, an insulating washer between said rims and adjacent one of them and having a terminal support portion extending therefrom, a pair of terminals carried in spaced relation by said support portion, a coil of magnet wire on said spool with the ends connected to said terminals, a strip of insulating tape extending radially outwardly along the inside of said washer and over the outer end of said terminal support portion for insulating the inner end of said coil and holding the same in place, a strip of insulating tape extending over the outer turns of said coil, external leads connected to said terminals, a strip of insulating tape folded over the outer end of said terminal support portion, said support portion with said terminals and strips of tape thereon extending over said coil between said rims, and a layer of insulation surrounding said coil and extending over said terminal support portion and through which said leads extend.

9. A magnet coil comprising, in combination, an insulating spool having annular rims at the ends, an insulating washer between said rims and adjacent one of them and having a terminal support portion extending therefrom, a pair of terminals carried in spaced relation by said support portion, a coil of magnet wire on said spool with the ends connected to said terminals, a strip of insulating tape extending radially outwardly along the inside of said washer and over the outer end of said terminal support portion for insulating the inner end of said coil and holding the same in place, a strip of insulating tape extending over the outer turns of said coil, the turns of said coil being so disposed as to provide a substantially greater number adjacent said washer than is provided adjacent the opposite rim whereby a lead space is provided thereadjacent, flexible insulated leads also connected to said terminals, a strip of insulating tape folded over the outer end of said terminal support portion, said support portion with said terminals and leads connected thereto and strips of tape thereon extending over said coil with said terminals and leads positioned in said lead space, said leads extending in opposite directions around said coil in said lead space, and an insulating sleeve snugly fitting over the outer edges of the rims of said spool with said leads projecting therethrough at a position spaced from said terminals.

10. Method of assembling a magnet coil which comprises, mounting an insulating strip carrying a pair of terminals on an insulating spool with the strip extending inside of and beyond one rim thereof, winding relatively small diameter insulated wire on the spool with the outer layer of the resulting coil on a bias to provide a lead receiving space between it and the other spool rim, connecting the ends of the coil to said terminals, connecting relatively large diameter insulated leads to said terminals so that they extend in opposite directions, folding said strip over said coil with said terminals and leads occupying said lead receiving space and said leads extending therearound, and disposing an insulating sleeve around and snugly fitting with said rims with said leads projecting therethrough at a point substantially opposite said terminals.

11. Method of assembling a magnet coil which comprises, mounting an insulating strip carrying a pair of terminals on an insulating spool with the strip extending inside of and beyond one rim thereof, placing the beginning end portion of a relatively small diameter insulated wire along said strip between it and said rim, placing a length of insulating tape along the inside of said strip to hold said wire end in place, winding the wire on the spool with the outer layer of the resulting coil on a bias to provide a lead receiving space between it and the other spool rim, placing the other end portion of the wire along the inside of said strip, placing a length of insulating tape over the outer surface of said coil in front of said strip, connecting said end portions of the wire to said terminals, connecting relatively large diameter insulated leads to said terminals so that they extend in opposite directions, applying a length of insulating tape over both sides of said strip to cover said terminals and extend a substantial distance beyond the same, folding said strip over said coil with said terminals and leads occupying said lead receiving space and said leads extending therearound, and disposing an insulating sleeve around and snugly fitting with said rims with said leads projecting therethrough at a point substantially opposite said terminals.

IRVING GEBEL.

REFERENCES CITED

The following references are of record in the file of this patent:

UNITED STATES PATENTS

| Number | Name | Date |
|---|---|---|
| 656,681 | Thomson | Aug. 28, 1900 |
| 1,100,178 | Forsberg | June 16, 1914 |
| 1,260,750 | Bryant | Mar. 26, 1918 |
| 1,340,027 | Dunham | May 11, 1920 |
| 1,389,056 | Lane | Aug. 20, 1921 |
| 1,932,923 | Bullinger | Oct. 31, 1933 |
| 1,967,652 | Austin et al. | July 24, 1934 |
| 1,950,156 | Swoboda | Mar. 6, 1934 |
| 2,049,919 | McCain | Aug. 4, 1936 |
| 2,150,388 | Martindell | Mar. 14, 1939 |
| 2,214,151 | Wagar | Sept. 10, 1940 |
| 2,243,553 | D'Entremont | May 27, 1941 |
| 2,269,114 | Keefe | Jan. 6, 1942 |
| 2,343,664 | Heiser et al. | Mar. 7, 1944 |

FOREIGN PATENTS

| Number | Country | Date |
|---|---|---|
| 455,124 | Great Britain | Oct. 14, 1936 |